US009832468B2

(12) United States Patent
Narayanan et al.

(10) Patent No.: US 9,832,468 B2
(45) Date of Patent: Nov. 28, 2017

(54) ELECTRONIC DEVICE FOR STORING IMAGE AND IMAGE STORAGE METHOD THEREOF

(71) Applicant: SAMSUNG ELECTRONICS CO., LTD., Suwon-si, Gyeonggi-do (KR)

(72) Inventors: Karthik Narayanan, Chennai (IN); Goun-young Kim, Seongnam-si (KR); Ha-joong Park, Suwon-si (KR); Santhosh Kumar Banadakoppa Narayanaswamy, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 171 days.

(21) Appl. No.: 14/332,825

(22) Filed: Jul. 16, 2014

(65) Prior Publication Data

US 2015/0023429 A1    Jan. 22, 2015

(30) Foreign Application Priority Data

Jul. 17, 2013    (IN) .......................... 3199/CHE/2013
Mar. 18, 2014    (KR) ........................ 10-2014-0031481

(51) Int. Cl.
*H04N 7/12*    (2006.01)
*H04N 11/02*    (2006.01)
(Continued)

(52) U.S. Cl.
CPC ......... *H04N 19/119* (2014.11); *H04N 19/136* (2014.11); *H04N 19/172* (2014.11);
(Continued)

(58) Field of Classification Search
CPC ...... H04N 19/119; H04N 19/85; H04N 19/59; H04N 19/188; H04N 19/172; H04N 19/136; H04N 19/46
(Continued)

(56) References Cited

U.S. PATENT DOCUMENTS

2001/0031002 A1    10/2001    Hashimoto et al.
2012/0044375 A1*    2/2012    Lin ..................... H04N 19/146
                                                                        348/222.1
(Continued)

FOREIGN PATENT DOCUMENTS

EP    2 477 415 A2    7/2012
WO    WO 2008/081458 A2    7/2008
WO    WO 2013/072889 A1    5/2013

OTHER PUBLICATIONS

International Search Report and Written Opinion issued for PCT/KR2014/006457 (dated Nov. 3, 2014).
Examination Report issued in related application AU 2014290997, dated Jan. 3, 2017, 3 pages.
Notice of Acceptance issued in related application AU 2014290997, dated May 1, 2017, 3 pages.

*Primary Examiner* — Jared Walker
(74) *Attorney, Agent, or Firm* — Drinker Biddle & Reath LLP

(57) ABSTRACT

An electronic device and an image storage method thereof are provided. The image storage method includes acquiring a plurality of image frames, determining a number of image frames per compressed file and a divided number for image frames, dividing each of the plurality of image frames into regions having a same size according to the divided number in response to the plurality of image frames being acquired, packaging the plurality of image frames divided into the regions having the same size according to the determined number of image frames per compressed file according to the regions, and compressing the packaged plurality of image frames and storing a compressed result.

14 Claims, 6 Drawing Sheets

(51) Int. Cl.
*H04N 11/04* (2006.01)
*H04N 19/119* (2014.01)
*H04N 19/46* (2014.01)
*H04N 19/172* (2014.01)
*H04N 19/136* (2014.01)
*H04N 19/85* (2014.01)
*H04N 19/59* (2014.01)
*H04N 19/169* (2014.01)

(52) U.S. Cl.
CPC ........... *H04N 19/188* (2014.11); *H04N 19/46* (2014.11); *H04N 19/59* (2014.11); *H04N 19/85* (2014.11)

(58) Field of Classification Search
USPC .................................................. 375/240.24
See application file for complete search history.

(56) References Cited

U.S. PATENT DOCUMENTS

| | | | | |
|---|---|---|---|---|
| 2012/0075508 A1* | 3/2012 | Shintani | ................ | H04N 5/217 |
| | | | | 348/251 |
| 2012/0134601 A1* | 5/2012 | Kinoshita | ................ | H04N 5/77 |
| | | | | 382/251 |
| 2012/0250758 A1* | 10/2012 | Jou | ................ | H04N 19/00121 |
| | | | | 375/240.03 |
| 2012/0250768 A1* | 10/2012 | Sethu | ................ | H04N 19/172 |
| | | | | 375/240.16 |
| 2012/0254456 A1 | 10/2012 | Visharam et al. | | |

* cited by examiner

ELECTRONIC DEVICE FOR STORING IMAGE AND IMAGE STORAGE METHOD THEREOF

CROSS-REFERENCE TO RELATED PATENT APPLICATION

This application claims the priority benefits from India Provisional Application No. 3199/CHE/2013, filed on Jul. 17, 2013, in the Indian Patent Office, and from Korean Patent Application No. 10-2014-0031481, filed on Mar. 18, 2014, in the Korean Intellectual Property Office, the disclosures of which are hereby incorporated by reference in their entirety.

BACKGROUND

1. Field

Apparatuses and methods consistent with various embodiments relate to an electronic device and an image storage method thereof, and more particularly, to an electronic device capable of efficiently encoding an image and storing an encoding result, and an image storage method thereof.

2. Related Art

As resolution for an image to be captured is increased, and methods of capturing images having various sizes and various effects become more easily performed, storage capacity needed to store images is increased. In other words, user's demands for an image having high resolution are increasingly growing. However, there is a limit to the capacity of a storage medium (e.g., a number of images that can be stored) since the storage capacity needed for the image is also increased according to the increase of the resolution.

In particular, since electronic devices such as digital cameras or portable phones recently used are often configured with a continuous-shooting function which captures a plurality of images in a short period of time, the storage capacity needed to store an image is quickly growing.

Further, some electronic devices allow the user to capture images having various resolutions through various simple operations. Therefore, where the electronic device includes an encoder configured to encode the various resolutions at which the user may capture images, the hardware specifications of the electronic device may become insufficient.

SUMMARY

Various embodiments may overcome one or more of the above disadvantages or other disadvantages not described above. However, it is understood that the various embodiments are not required to overcome the disadvantages described above, and may not overcome any of the disadvantages described above.

Various embodiments provide an electronic device capable of efficiently storing a plurality of images regardless of resolutions of acquired images, and an image storing method thereof.

According to an embodiment, an image storage method of an electronic device is described. The method may include: acquiring a plurality of image frames; determining a number of image frames per compressed file and a divided number for image frames; dividing each of the plurality of image frames into regions having a same size according to the determined divided number in response to the plurality of image frames being acquired; packaging the plurality of image frames divided into the regions having the same size according to the determined number of image frames per compressed file, according to the regions; and compressing the packaged plurality of image frames and storing a compressed result.

The method may further include padding an additional region to each frame of the plurality of image frames so that a resolution of each frame is an integer multiple of a stored image resolution.

The compressing may include encoding the packaged image frames to a moving image format and storing an encoding result.

The acquiring may include acquiring the plurality of image frames using a continuous-shooting mode.

The storing may include storing the compressed result by including a plurality of thumbnail images corresponding to the plurality of image frames in the packages.

The compressing may include generating header information including information for a number of acquired image frames, the number of image frames per compressed file, and the determined divided number for image frames, and storing the compressed result including the header information.

The method further include, in response to a user input of a user command for displaying a selected image frame of the plurality of image frames, analyzing the header information included in the packaged plurality of image frames, and decoding a compressed file according to an analysis result and merging the regions into one image.

According to another embodiment, there is provided an electronic device. The electronic device may include: an image acquisition unit configured to acquire a plurality of image frames; a determination unit configured to determine a number of image frames per compressed file and a divided number for image frames; a division unit configured to divide each of the plurality of image frames to regions having a same size according to the determined divided number in response to the plurality of image frames being acquired through the image acquisition unit; a packaging unit configured to package the plurality of image frames divided into the regions having the same size according to the determined number of image frames per compressed file, according to the regions; an encoder configured to compress the packaged plurality of image frames; and a storage unit configured to store the one or more compressed packages.

The division unit may pad an additional region to each frame of the plurality of image frames so that a resolution of each frame is an integer multiple of a stored image resolution.

The encoder may encode the packaged image frames to a moving image format.

The image acquisition unit may further include a capturing unit, and the capturing unit acquires the plurality of image frames using a continuous-shooting mode.

The encoder may encode the packaged plurality of image frames by including a plurality of thumbnail images corresponding to the plurality of image frames in the packaged plurality of image frames.

The electronic device may further include a header information generator configured to generate header information including information for a number of acquired image frames, the number of image frames per compressed file, and the determined divided number for image frames, and the encoder may compress the packaged plurality of image frames by including the generated header information in the packaged plurality of image frames.

The electronic device may further include a decoder and a user input unit. The decoder may analyze the header information, decode a compressed file according to an analysis result, and merge decoded regions into one image, in response to a user command for displaying the image frame being input through the user input unit.

According to the above-described various embodiments, the user may efficiently store a plurality of images regardless of resolutions of acquired images.

Additional features and advantages of various embodiments will be set forth in the detailed description, will be apparent from the detailed description, or may be learned by practicing the various embodiments.

BRIEF DESCRIPTION OF THE DRAWINGS

The above and/or other embodiments will be more apparent by describing in detail various embodiments, with reference to the accompanying drawings, in which.

DETAILED DESCRIPTION

Figure 1:
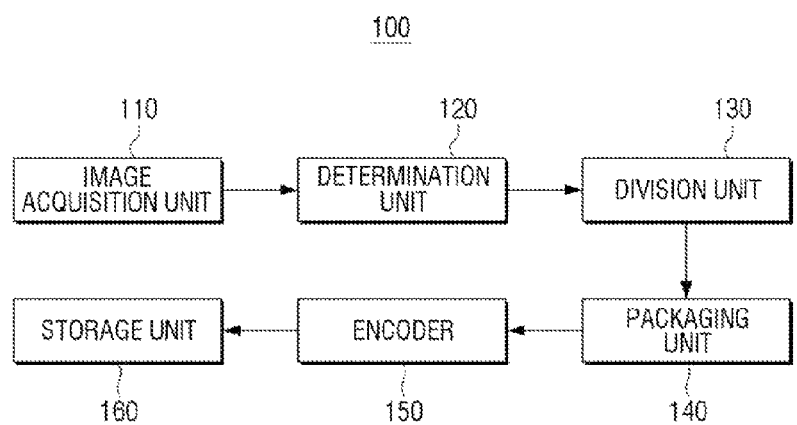
FIG. 1 is a block diagram illustrating a configuration of an electronic device according to an embodiment.

Various embodiments will now be described more fully with reference to the accompanying drawings in which some embodiments are shown. In this regard, the embodiments may have different forms and should not be construed as being limited to the descriptions set forth herein. Accordingly, the embodiments are merely described below, by referring to the figures, to explain features of the present description. Further, in describing the embodiments, detailed description of known functions and constructions will be omitted if it is deemed that they unnecessarily obscure the essence of the invention.

It will be understood that, although the terms first, second, etc. may be used herein in reference to elements of the description, such elements should not be construed as limited by these terms. The terms may be used only to distinguish one element from another element. Furthermore, recitation of ranges of values herein are merely intended to serve as a shorthand method of referring individually to each separate value falling within the range, unless otherwise indicated herein, and each separate value is incorporated into the specification as if it were individually recited herein.

The use of the terms "a" and "an" and "the" and similar referents in the context of describing the invention (especially in the context of the following claims) are to be construed to cover both the singular and the plural, unless the context clearly indicates otherwise. It will be further understood that no item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

FIG. 1 is a block diagram illustrating a configuration of an electronic device 100 according to an embodiment. As illustrated in FIG. 1, the electronic device 100 includes an image acquisition unit 110, a determination unit 120, a division unit 130, a packaging unit 140, an encoder 150, and a storage unit 160. The electronic device 100 may be an image capturing device such as a camera. However, this is merely for explanatory purposes, and the electronic device 100 may be implemented by various electronic devices including a storage unit configured to store data, such as a portable phone, a tablet personal computer (PC), a camcorder, a laptop PC, a personal digital assistant (PDA), a plasma display panel (PDP), a television (TV), or other electronic apparatus having image storage capabilities.

The image acquisition unit 110 is configured to acquire an image frame. The image acquisition unit 110 may include a capturing unit 111. That is, the image acquisition unit 110 may capture an image through the capturing unit 111 and acquire the image frame. The capturing unit 111 may acquire a plurality of image frames using a continuous-shooting mode. The plurality of image frames may be images associated with each other.

The capturing unit 111 converts an optical signal input through a lens (not shown) into an electrical signal through an image sensor, and receives an image of a subject. As referred to herein, "subject" may indicate all objects including a main subject and a background in a captured image. The technical features of the capturing unit 111 are known technology, and thus detailed description thereof will be omitted.

In the present embodiment, the image acquisition unit 110 acquires the image frame through the capturing unit 111. In other embodiments, the image acquisition unit 110 may acquire the image frame through various methods, such as a method of receiving and acquiring an image frame from an external apparatus connected to the electronic device through a wireless or wired interface (not shown).

The determination unit 120 is configured to determine a number of image frames per compressed file and a divided number for image frames.

The compressed file (or each of a plurality of compressed files) includes image frames corresponding to the number of image frames per compressed file. For example, if compression will be performed by processing an I-frame, a P-frame, and a B-frame to increase compression efficiency, the number of image frames per compressed file is 3 image frames per compressed file.

The divided number for image frames refers to a number of regions for each image frame, where the image frame is divided into regions having a same size. A stored image resolution of a storable image is preset in the electronic device 100, for example, based on an encoding format. Therefore, if an acquired image resolution of the image acquired through the image acquisition unit 110 is greater than the stored image resolution, the acquired image frame is divided into regions which have a same resolution as the stored image resolution. Therefore, the divided number for image frames means the number of regions for each image frame so that the image frame is stored with a certain resolution.

In response to a plurality of image frames being acquired through the image acquisition unit 110, the division unit 130 is configured to divide each of the plurality of image frames into regions having the same size according to the determined divided number.

That is, in response to determining that each image frame is to be divided into four regions through the determination unit 120, the division unit 130 may divide each of the plurality of image frames into the four regions having the same size.

Further, the division unit 130 may pad one or more additional regions to each of the plurality of image frames, and divide each of the plurality of image frames to which the additional regions have been padded into the regions having the same sizes.

That is, the division unit 130 may divide the image frame into the regions to be suitable for the stored image resolution of the image which is storable through the storage unit 160 according to hardware characteristics of the storage unit 160.

If the resolution of the acquired image frame is not an integer multiple of the stored image resolution of the image storable through the storage unit 160, the division unit 130 may pad one or more additional regions to an image frame so that the resolution of the padded image frame becomes the integer multiple of the stored image resolution of the image storable through the storage unit 160.

The packaging unit 140 is configured to package the plurality of image frames into one or more packages. Specifically, the packaging unit 140 packages the regions of the plurality of image frames into packaged plurality of image frames according to the number of image frames per compressed file as determined by the determination unit 120.

If the plurality of image frames have been divided into the regions by the division unit 130, then the packaging unit 140 packages the plurality of image frames divided into the regions having the same size according to the determined number of image frames per compressed file, according to the regions. For example, where each image frame of first, second, and third frames is divided into two regions including a left region and a right region, and the number of image frames per compressed file is three, the packaging unit 140 may package left regions of the first frame, the second frame, and the third frame into a first package, and may package right regions of the first frame, the second frame, and the third frame into a second package.

The encoder 150 is configured to compress the packaged regions (i.e., the regions of the first package and of the second package). In particular, the encoder 150 may encode the regions within a package with a moving image format such as a moving picture experts group (MPEG) format to obtain a compressed file. That is, the encoder 150 may encode the regions within a package with a moving image format having a preset resolution. For example, if the image frame is being stored to a standard definition (SD) resolution in the electronic device 100, the encoder 150 may encode the image frame to a 720×480 resolution and store an encoding result as a compressed file.

Further, the encoder 150 may encode the regions of the packages by including a plurality of thumbnail images corresponding to the plurality of image frames with the compressed file.

The storage unit 160 is configured to store compressed files of the image frames. The storage unit 160 may store various types of images such as an image encoded to a still image format (e.g., a joint photographic experts group (JPEG) format) or an image encoded to a moving image format (e.g., MPEG format).

The electronic device 100 may further include a header information generator 170. That is, the header information generator 170 may generate header information which is packaged and compressed with the plurality of image frames.

The header information may include information for the number of acquired image frames, the number of image frames per compressed file, and the divided number for image frames. The header information may further include information for a width and a height of the regions. Further details of the header information will be described below.

The electronic device 100 may include a decoder 180 and a user input unit 190.

The decoder 180 is configured to decode the compressed image frame. In an embodiment, the encoder 150 and the decoder 180 of the electronic device 100 are implemented as an MPEG encoder and an MPEG decoder, respectively, which allows for storage of the image frame with a moving image format. In this case, both the MPEG encoder and the MPEG decoder may include circuits which comply with a H.264 standard. For clarity, a circuit configuration for the MPEG decoder will be exemplarily described. The MPEG decoder may include an entropy decoding unit configured to receive a network abstraction layer (NAL) which is a compressed bit stream and perform entropy decoding on the NAL, a reordering unit configured to recorder data to a group, an inverse-quantization unit configured to inversely quantize data output from the reordering unit, an inverse discrete cosine transform (IDCT) unit configured to perform IDCT on the inversely quantized data, an intra/inter data prediction unit configured to perform intra-data prediction or inter-data prediction and compensate a prediction result, and an in-loop deblocking filter configured to remove an error occurring in the inverse-quantization process.

In response to a user command, input through the user input unit 190, for displaying the image frame, the decoding unit 180 may analyze the header information included in the compressed file, and decode the compressed file according to an analysis result. Further, if the image frame was divided and encoded before being stored, the decoding unit may merge the regions into one image.

Via the electronic device 100 as described above, the user may encode the image frame to a preset resolution using a method of dividing (or padding and dividing) the image frame, and storing an encoding result as a compressed file without individually configuring an encoder to encode the image frame according to a plurality of resolutions.

Hereinafter, a method of dividing and storing an image frame will be described in detail with reference to FIGS. 2 to 4.

Figure 2:
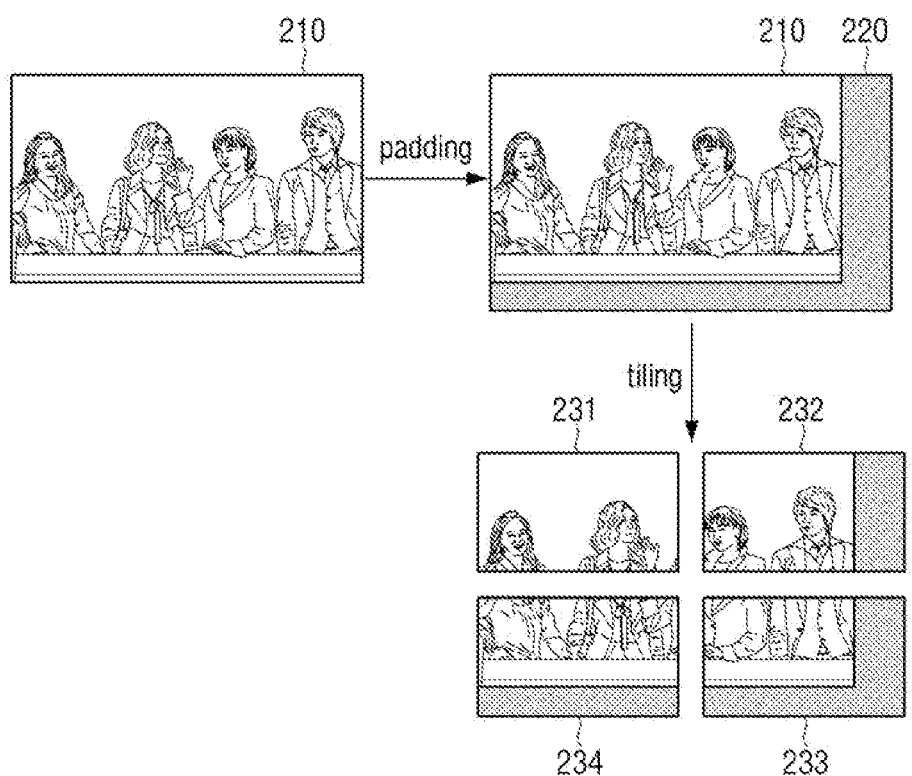
FIG. 2 is a view illustrating a method of padding an additional region to a plurality of image frames, and dividing the plurality of image frame according to an embodiment.

FIG. 2 is a view illustrating a method of dividing an image frame by padding an additional region to the acquired image according to a preset resolution in order for the encoder 150 to encode the image.

For example, if the acquired image resolution of an acquired image 210 of FIG. 2 is 2592×1944, and the stored image resolution of a storable image for the encoder 150 of the electronic device 100 is an ultra-high density (UHD) resolution of 3840×2160, the electronic device 100 may pad an additional region 220 to the image frame so that the resolution of the padded image frame becomes 3840×2160. In this case, the electronic device 100 stores the padded image frame without performing division of the acquired image frame. That is, in the above-described embodiment, a tiling operation of FIG. 2 is not necessary.

If the acquired image resolution of the acquired image 210 of FIG. 2 is 2592×1944, and the stored image resolution of the storable image for the encoder of the electronic device 100 is a full HD resolution of 1920×1080, the electronic device 100 performs the tiling operation for dividing the image frame.

Specifically, the stored image resolution of the storable image for the encoder 150 of the electronic device 100 is the full HD resolution of 1920×1080, and the resolution of the regions becomes 1296×972 in response to the acquired image 210 being divided into four. Therefore, the resolution of the region is not suitable for the hardware characteristics of the electronic device 100.

Accordingly, before the dividing of the image frame, the electronic device 100 pads an additional region 220 to each of the plurality of image frames. That is, the electronic device 100 may pad the additional region 220 to each of the plurality of image frames so that the resolution becomes an integer multiple of the stored image resolution of 1920×1080.

Specifically, to have a size which may include the acquired image 210 having the resolution of 2592×1944, the electronic device 100 may pad the additional region 220 to the acquired image 210 so that the resolution of the acquired image becomes two times the stored image resolution of the storable image which is 1920×1080.

Therefore, the electronic device 100 may pad the additional region 220 to the acquired image 210 so that the resolution of the padded image becomes 3840×2160 and thus an integer multiple of the stored image resolution.

Then, the electronic device 100 divides the image frame to which the additional region 220 is padded into four regions having the same size. That is, the tiling process means a process of dividing the image frame into regions of the same size.

As a result, the electronic device 100 may acquire four regions per image frame, the regions having the resolution of 1920×1080 which is the stored image resolution of the storable image from the encoder 150.

The electronic device 100 may determine the number of image frames per compressed file. The electronic device 100 may control the packaging unit 140 to package the plurality of image frames divided into the regions having the same size according to the regions.

Figure 3:
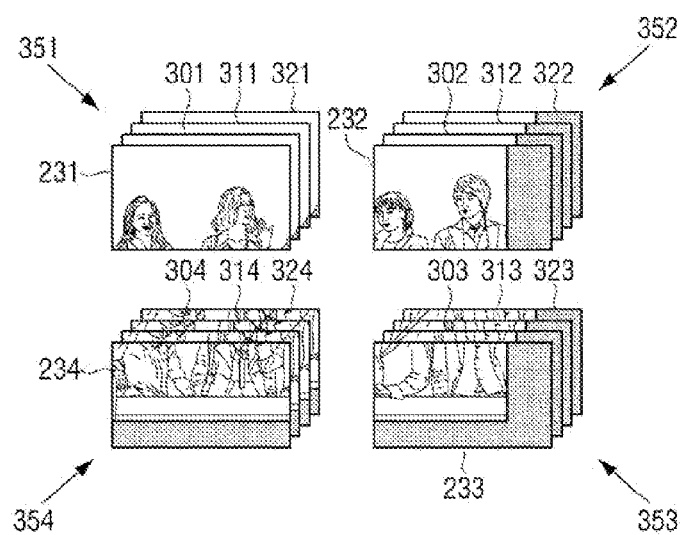
FIG. 3 is view illustrating a method of packaging a plurality of image frames according to an embodiment.

For example, in response to determining that four image frames are to be included per compressed file by the determination unit 120, the packaging unit 140 may package the plurality of image frames divided into the regions having the same size in four packages 351, 352, 353, and 354 of four regions each, according to the regions as illustrated in FIG. 3.

Specifically, after dividing the acquired image 210 into four regions (e.g., image tiles or division images), and designating a region in an upper-left location as a first region 231, and designating the remaining regions as a second region 232 (upper-right location), a third region 233 (lower-right location), and a fourth region 234 (lower-left location) in a clockwise rotation, the packaging unit 140 may package the regions with the same location into separate packages.

As illustrated in FIG. 3, the packaging unit 140 may package the first region 231 of a first acquired image, a first region 301 of a second acquired image, a first region 311 of a third acquired image, and a first region 321 of a fourth acquired image to the first package 351 (e.g., regions with an upper-left location). The packaging unit 140 may package the second region 232 of the first acquired image, a second region 302 of the second acquired image, a second region 312 of the third acquired image, and a second region 322 of the fourth acquired image to the second package 352 (e.g., regions with an upper-right location). The packaging unit 140 may package the third region 233 of the first acquired image, a third region 303 of the second acquired image, a third region 313 of the third acquired image, and a third region 323 of the fourth acquired image to the third package 353 (e.g., regions with a lower-right location). The packaging unit 140 may package the fourth region 234 of the first acquired image, a fourth region 304 of the second acquired image, a fourth region 314 of the third acquired image, and a fourth region 324 of the fourth acquired image to the fourth package 354 (e.g., regions with a lower-left location).

Therefore, the packaging unit 140 may generate four packages 351, 352, 353, and 354 including the regions of the four image frames with respect to the locations as illustrated in FIG. 3. The encoder 150 may encode the regions of the packages and store an encoding result as a compressed file in the storage unit 160. That is, since the resolutions of the regions included in the packages 351, 352, 353, and 354 are the same, that is, 1920×1080, the encoder 150 (e.g., an MPEG encoder) may encode each of the packages and store an encoding result as a compressed file in the storage unit.

Figure 4:
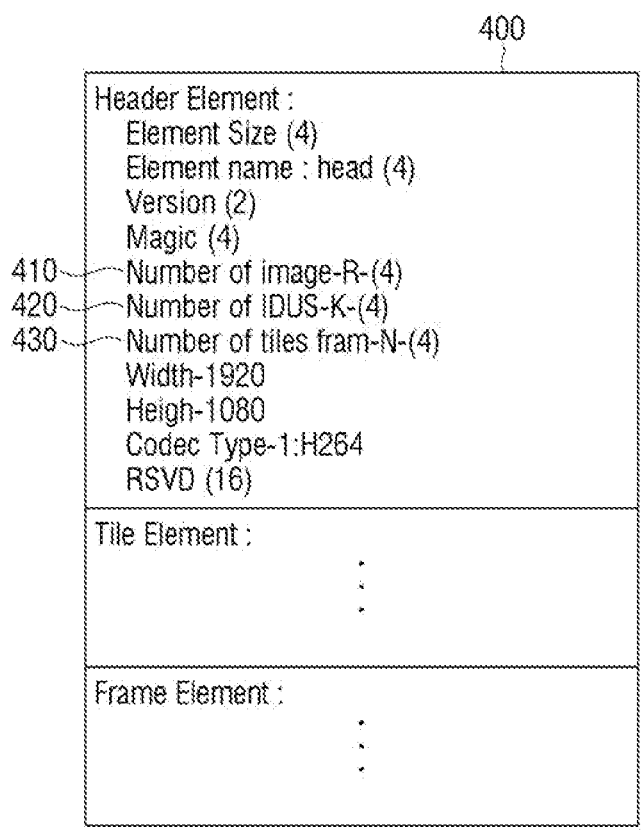
FIG. 4 is a view illustrating header information according to an embodiment.

FIG. 4 is a view illustrating header information according to an embodiment.

The electronic device 100 may generate header information 400 including information for the number of acquired image frames, the number of image frames per compressed file, and the divided number for image frames through the header information generator 170.

That is, the header information 400 may include various pieces of information for the encoded image frames. In particular, the header information 400 may include the number 410 of image frames, the number 420 of image frames per compressed file, and the divided number 430 for image frames.

The number 410 of image frames means the total number of image frames with respect to the images acquired through the image acquisition unit 110. That is, as illustrated in FIG. 4, "Number of image" indicated in the header information 400 is 4, and thus it can be understood that four image frames have been acquired.

"IDU (Independently Decodable Unit)" means the number of image frames per compressed file. Therefore, "Number of IDUS" indicated in the header information 400 is 4, and thus the number of image frames per compressed file is 4.

The divided regions of the image frame may be referred to as an image tile. Therefore, where "Number of tiles frame 430" is 4 means that one image frame is divided into four regions having the same size.

In addition to the above-described information, the header information 400 may store information for a width and a height of the storable image. That is, as illustrated in FIG. 4, "Width and Height" may include information that a width of the storable image is 1920, and a height of the storable image is 1080.

The contents of the above-described header information 400 are merely exemplary, and the header information may include various pieces of information for the stored image frame such as a type of a codec or the number of total tiles.

Figure 5:
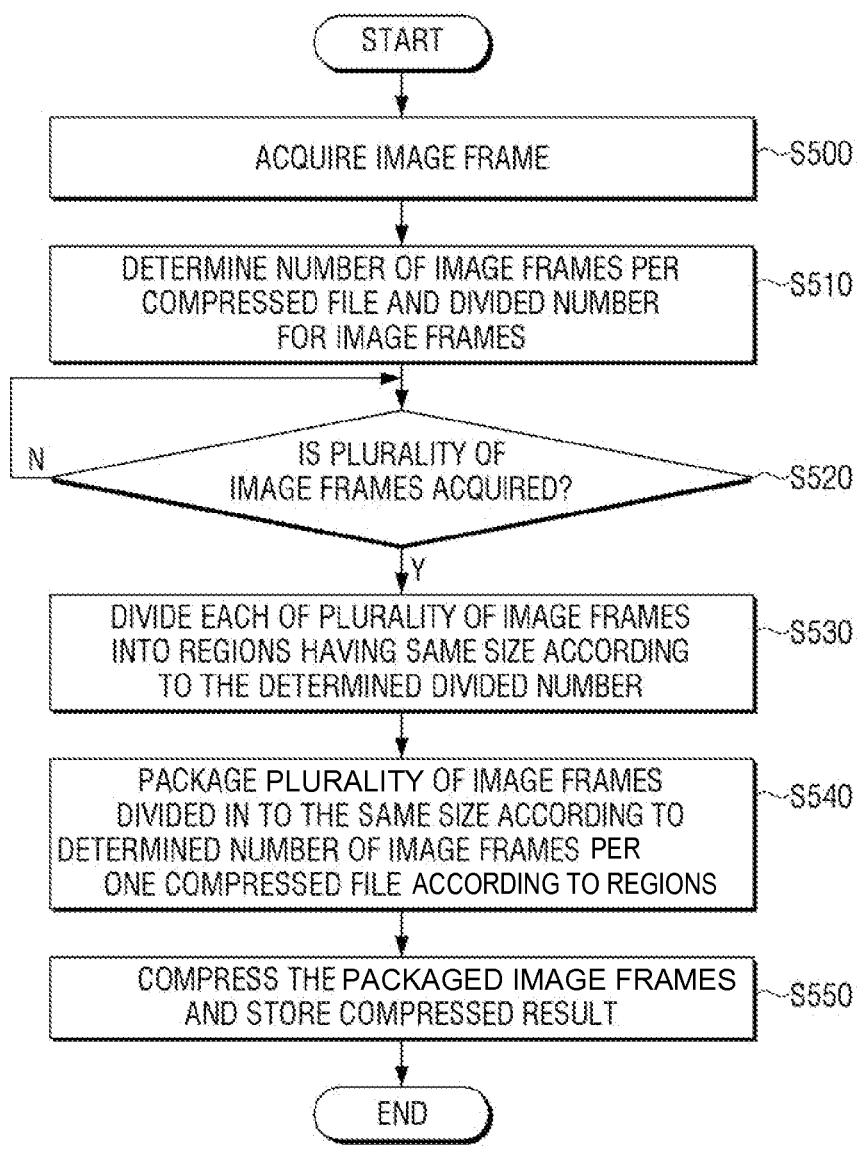
FIG. 5 is a flowchart illustrating a method of encoding a plurality of image frames according to an embodiment.

FIG. 5 is a flowchart illustrating a method of encoding a plurality of images according to an exemplary embodiment.

First, the electronic device 100 acquires an image frame (S500). The electronic device 100 may include the capturing unit 111, and capture an image through the capturing unit 111 and acquire the image frame. In particular, the capturing unit 111 may acquire a plurality of image frames using a continuous-shooting mode. In this case, the plurality of image frames may be associated images having small differences between corresponding capture times.

However, the method of acquiring the image frame through the capturing unit 111 is merely exemplary, and the electronic device 100 may acquire the image frame through various methods, for example, a method of receiving and acquiring an image frame from an external apparatus connected to the electronic device in a wireless manner or a wired manner.

The electronic device 100 determines the number of image frames per compressed file and the divided number for image frames (S510). Specifically, the compressed files include the preset number of image frames. For example, when compressing the image frame by mixing the I-frame, P-frame, and B-frame to increase compression efficiency, the number of image frames per compressed file is 3.

The divided number for image frames refers to the number of regions for each image frame, where the image frame is divided into the regions of the same size. For example, a stored image resolution of the storable image is preset in the electronic device 100. Therefore, if an acquired image resolution of the image acquired through the image acquisition unit 110 is greater than the stored image resolution of the storable image, the electronic device 100 divides the acquired image frame into regions to match the stored image resolution of the storable image. Therefore, the divided number for image frames refers to the number of regions for each image frames, where the image frame is divided into regions of the same size so as to store the image frame to a certain resolution (i.e., the stored image resolution).

In response to determining that a plurality of image frames have been acquired (Y at S520), the electronic device 100 divides each of the plurality of image frames into regions having the same size according to the determined divided number (S530).

If the stored image resolution of the storable image is preset according to hardware characteristics of the electronic device 100, the electronic device 100 may divide the acquired image frame if the acquired image resolution of the acquired image frame is greater than the stored image resolution.

Further, the electronic device 100 may pad an additional region to each of the plurality of image frames, and divide the padded image frame into the regions having the same size.

That is, if the acquired image resolution of the acquired image frame is not an integer multiple of the stored image resolution of the storable image, the electronic device 100 may pad the additional region to each image frame so that the resolution of the image frame becomes an integer multiple of the stored image resolution of the storable image.

The electronic device 100 may divide the image frame including the additional region into the regions having the same size.

If the resolution of the padded image frames is the same as the stored image resolution of the storable image, the electronic device 100 may package the padded image frames, compress the packaged image frames, and store a compressed result without performing division of the padded image frame.

Further, the electronic device 100 packages the plurality of image frames divided into the same size according to the determined number of image frames per compressed file, according to the regions (S540).

For example, if each image frame is divided into two regions of a left region and a right region, and the number of image frames per compressed file is three, then the electronic device 100 may package left regions of a first frame, a second frame, and a third frame to a first package, and package right regions of the first frame, the second frame, and the third frame to a second package.

The electronic device 100 compresses the packaged image frames (i.e., the first and second packages) and stores the compressed result (e.g., as compressed files) (S550). In particular, the electronic device 100 may encode the packaged image frames with a moving image format such as the MPEG format.

Figure 6:
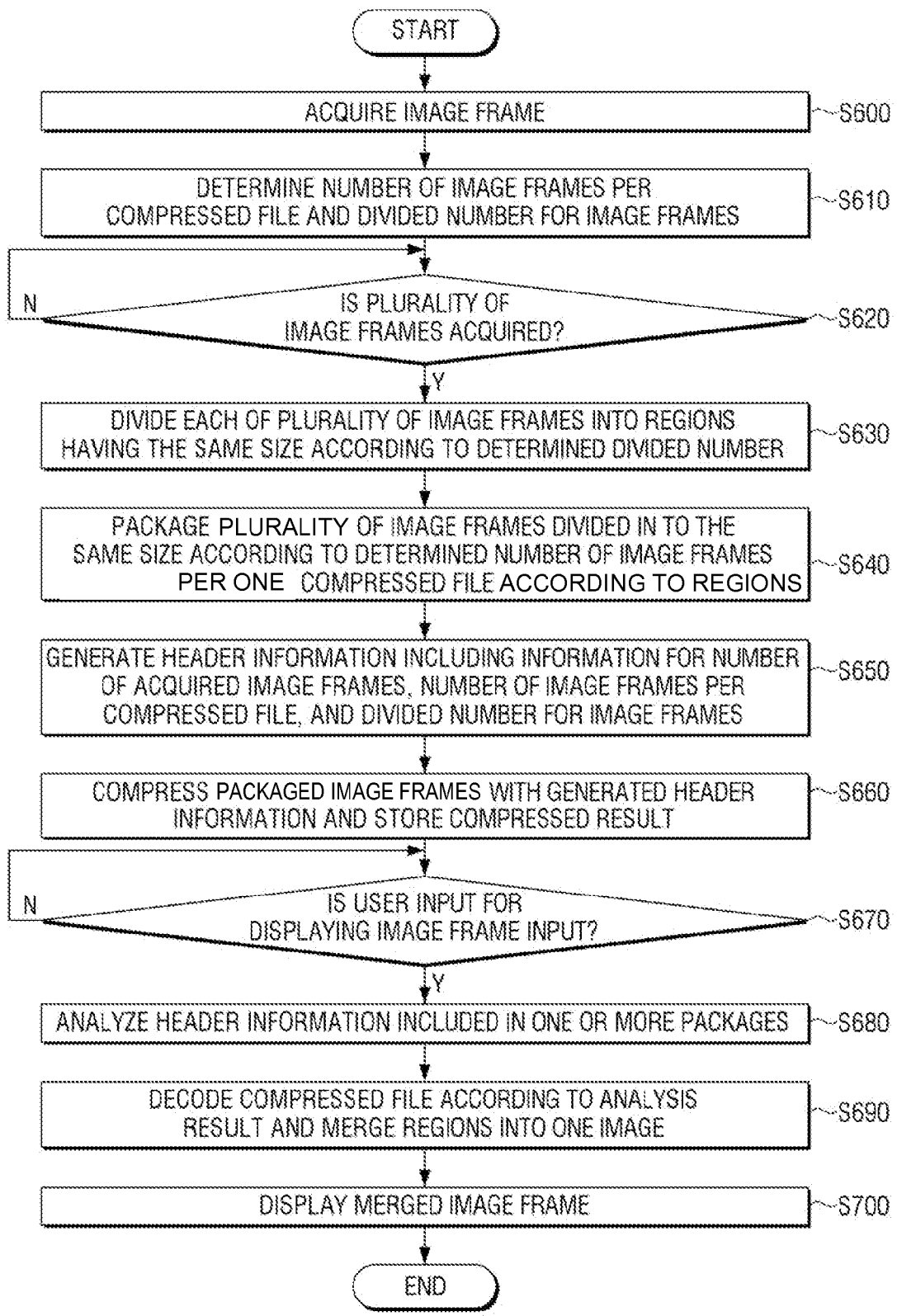
FIG. 6 is a flowchart illustrating an encoding and decoding method of an image frame according to an embodiment.

FIG. 6 is a flowchart illustrating a method of encoding and decoding an image frame according to an embodiment.

First, the electronic device 100 acquires an image frame (S600). The electronic device 100 may include the capturing unit 111, and capture an image through the capturing unit 111 and acquire the image frame. In particular, the capturing unit 111 may acquire a plurality of frame images using a continuous-shooting mode. In this case, the plurality of image frames may be associated images having a small difference between corresponding capture times.

However, the method of acquiring the image frame through the image capturing unit 111 is merely exemplary, and the electronic device 100 may acquire the image frame through various methods, for example, a method of receiving and acquiring an image frame from an external apparatus connected to the electronic device in a wireless manner or a wired manner.

The electronic device 100 determines the number of image frames per compressed file and the divided number for image frames (S610). Specifically, a compressed file includes the preset number of image frames. For example, for compression of the image frame by mixing an I-frame, P-frame, and B-frame to increase compression efficiency, the number of image frames per compressed file is 3.

The divided number for image frames refers to the number of regions for each image frame, where the image frame is divided into regions of the same size. For example, the stored image resolution of the storable image is preset in the electronic device 100. Therefore, if an acquired image resolution of the image acquired through the image acquisition unit 110 is greater than the stored image resolution of the storable image, the electronic device 100 divides the acquired image frame into regions to match the stored image resolution of the storable image. Therefore, the divided number for image frames refers to the number of regions for each image frame, where the image frame is divided into regions of the same size so as to store the image frame to a certain resolution (i.e., the stored image resolution).

In response to determining that a plurality of image frames have been acquired (Y at S620), the electronic device 100 divides each of the plurality of image frames into regions having the same size according to the determined divided number (S630).

If the stored image resolution of the storable image is preset according to hardware characteristics of the electronic device 100, the electronic device 100 may divide the acquired image frame if the acquired image resolution of the acquired image frame is greater than the stored image resolution.

Further, the electronic device 100 may pad an additional region to each of the plurality of image frames, and divide the padded image frame into the regions having the same size.

That is, if the acquired image resolution of the acquired image frame is not an integer multiple of the stored image resolution of the storable image, the electronic device 100 may pad the additional region to each image frame so that the resolution of the image frame becomes an integer multiple of the stored image resolution of the storable image.

The electronic device 100 may divide the image frame including the additional region into the regions having the same size.

If the resolution of the padded image frame is the same as the stored image resolution of the storable image, the electronic device 100 may package the padded image frames, compress the packaged image frames, and store a compressed result without performing division of the padded image frame.

Further, the electronic device 100 packages the plurality of image frames divided into the regions having the same size according to the determined number of image frames per compressed file according to the regions (S640).

For example, if each image frame is divided into two regions including a left region and a right region, and the number of image frames per compressed file is three, then the electronic device 100 may package left regions of a first frame, a second frame, and a third frame to a first package, and package right regions of the first frame, the second frame, and the third frame to a second package.

The electronic device 100 may generate header information including information for the number of acquired image frames, the number of image frames per compressed file, and the divided number for image frames (S650). The header information may include various pieces of information for the encoded and decoded image frame. In addition to the information for the number of image frames acquired, the number of image frames per compressed file, and the divided number for image frames as described above, the header information may include other pieces of information for the image frame.

The electronic device 100 generates the packaged image frame, compresses the packaged image frames (e.g., the first and second packages) with the header information, and stores a compressed result as compressed files (S660). In other embodiments, the electronic device 100 may compress the plurality of image frames by including a plurality of thumbnail images corresponding to the plurality of image frames in addition to the header information, and store a compressed result.

In response to a user command for displaying the image frame being input (Y at S670), the electronic device 100 analyzes the header information included in the packaged image frames (S680). Then, the electronic device 100 decodes regions from one or more compressed files according to an analysis result, and merges the regions into one image (S690).

That is, the electronic device 100 may determine whether an image frame to be displayed to the user is an n-th region included in an m-th compressed file based on the header information. Specifically, since the header information includes information for the number of total image frames (i.e., four image frames in FIG. 3) and the number of image frames per compressed file (i.e., four image frames in FIG. 3), the electronic device 100 may analyze the header information, and determine whether the image frame to be displayed to the user is an n-th frame included in an m-th compressed file.

In response to determining which compressed files must be decoded for the image frame, the electronic device 100 decodes the compressed files necessary for displaying the image frame. That is, in response to dividing the image frame into four regions having the same size, packaging the regions, and encoding the packaged images, the electronic device 100 may determine four packages according to an analysis result of the header information, and perform decoding of the four packages based on the determination result.

The electronic device 100 merges first, second, third, and fourth decoded regions from the four packages, and displays the merged image frame (S700).

If the additional regions have been included (i.e., padding), then as a result of decoding of the encoded image frame, the electronic device 100 may merge the first, second, third, and fourth decoded regions, delete or remove the additional region (i.e., the additional region 220), and display the image frame.

The user may efficiently store a plurality of images by the above-described electronic apparatus 100 regardless of resolution of the acquired image.

Further, the user may store various images with unified resolution using a method of padding an additional region or dividing the image frame into the preset number regardless of resolutions of the various images.

The methods according to the above-described various embodiments may be coded in software and stored in a non-transitory computer readable medium. The non-transitory computer readable medium may be mounted on various apparatuses and used.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

The foregoing exemplary embodiments and advantages are merely exemplary and are not to be construed as limiting the present inventive concept. The exemplary embodiments can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. A method of storing an image of an electronic device, the method comprising:
acquiring a plurality of image frames;
determining a preset number of image frames per compressed file and a divided number for image frames;
dividing each of the plurality of image frames into regions having a same size and a respective location within a corresponding image frame according to the determined divided number in response to the plurality of image frames being acquired;
packaging the plurality of image frames divided into the regions having the same size and the same respective location into a same package according to the determined preset number of image frames per compressed file, according to the regions, wherein a first region of each of the plurality of image frames, corresponding to a same first location, is packaged to a first package and a second region of each of the plurality of image frames, corresponding to a same second location, is packaged to a second package; and
compressing the packaged plurality of image frames and storing a compressed result.

2. The method as claimed in claim 1, further comprising padding an additional region to each frame of the plurality of image frames so that a resolution of each frame is an integer multiple of a stored image resolution.

3. The method as claimed in claim 1, wherein the compressing includes encoding the packaged image frames to a moving image format and storing an encoding result.

4. The method as claimed in claim 1, wherein the acquiring includes acquiring the plurality of image frames using a continuous-shooting mode.

5. The method as claimed in claim 1, wherein the storing includes storing the compressed result by including a plurality of thumbnail images corresponding to the plurality of image frames in the packaged plurality of image frames.

6. The method as claimed in claim 1, wherein the compressing includes generating header information including information for a number of acquired image frames, the preset number of image frames per compressed file, and the determined divided number for image frames, and storing the compressed result including the header information.

7. The method as claimed in claim 6, further comprising, in response to a user input of a user command for displaying a selected image frame of the plurality of image frames,
analyzing the header information included in the packaged plurality of image frames; and
decoding a compressed file according to an analysis result and merging the regions into one image.

8. An electronic device, comprising:
a processor that comprises:
an image acquisition unit configured to acquire a plurality of image frames;
a determination unit configured to determine a preset number of image frames per compressed file and a divided number for image frames;
a division unit configured to divide each of the plurality of image frames into regions having a same size and a respective location within a corresponding image frame according to the determined divided number in response to the plurality of image frames being acquired through the image acquisition unit;
a packaging unit configured to package the plurality of image frames divided into the regions having the same size and the same respective location into a same package according to the determined preset number of image frames per compressed file, according to the regions, wherein a first region of each of the plurality of image frames, corresponding to a same first location, is packaged to a first package and a second region of each of the plurality of image frames, corresponding to a same second location, is packaged to a second package;
an encoder configured to compress the packaged plurality of image frames; and a storage unit configured to store the one or more compressed packages.

9. The electronic device as claimed in claim 8, wherein the division unit pads an additional region to each frame of the plurality of image frames so that a resolution of each frame is an integer multiple of a stored image resolution.

10. The electronic device as claimed in claim 8, wherein the encoder encodes the packaged image frames to a moving image format.

11. The electronic device as claimed in claim 8, wherein the image acquisition unit further includes a capturing unit, and the capturing unit acquires the plurality of image frames using a continuous-shooting mode.

12. The electronic device as claimed in claim 8, wherein the encoder encodes the packaged plurality of image frames by including a plurality of thumbnail images corresponding to the plurality of image frames in the packaged plurality of image frames.

13. The electronic device as claimed in claim 8, wherein the processor further comprises a header information generator configured to generate header information including information for a number of acquired image frames, the number of preset image frames per compressed file, and the determined divided number for image frames,
wherein the encoder compresses the packaged plurality of image frames by including the generated header information in the packaged plurality of image frames.

14. The electronic device as claimed in claim 13, wherein the processor further comprises:
a decoder; and
a user input unit,
wherein the decoder analyzes the header information, decodes a compressed file according to an analysis result, and merges decoded regions into one image, in response to a user command for displaying the image frame being input through the user input unit.

* * * * *